(12) United States Patent
McColgan et al.

(10) Patent No.: US 11,088,917 B1
(45) Date of Patent: Aug. 10, 2021

(54) LAB RESOURCE PLATFORM

(71) Applicant: Juniper Networks, Inc., Sunnyvale, CA (US)

(72) Inventors: Edward McColgan, Leominster, MA (US); Robert Donle, Greenland, NH (US); Phillip J. Wisdom, Wilmington, MA (US); Omar Shihadeh Ansari, Fremont, CA (US); Wasim Raza, Fremont, CA (US); Lovan Hoang, Revere, MA (US); Eric A. Olson, Salem, MA (US); Justin D. Hayes, Lafayette, CO (US); Sathyasekaran Sadanandam, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 49 days.

(21) Appl. No.: 16/125,284

(22) Filed: Sep. 7, 2018

(51) Int. Cl.
*H04L 12/24* (2006.01)

(52) U.S. Cl.
CPC .............. *H04L 41/12* (2013.01); *H04L 41/08* (2013.01)

(58) Field of Classification Search
CPC ....... H04L 41/12; H04L 41/08; H04L 41/145; H04L 47/829; H04L 45/02; H04L 41/0893; G06F 11/3051; G06F 9/5072; G06F 9/5077; G06Q 10/087
See application file for complete search history.

(56) References Cited

U.S. PATENT DOCUMENTS

| | | | | |
|---|---|---|---|---|
| 8,606,922 B1 * | 12/2013 | Greenfield | ............ | G06F 9/5027 709/226 |
| 2011/0029882 A1 * | 2/2011 | Jaisinghani | ............. | H04L 41/12 715/736 |
| 2013/0346260 A1 * | 12/2013 | Jubran | ................. | G06Q 10/087 705/28 |
| 2014/0143422 A1 * | 5/2014 | Joseph | ...................... | G06F 8/60 709/226 |
| 2014/0245295 A1 * | 8/2014 | Tsirkin | ................ | G06F 9/45533 718/1 |
| 2014/0258052 A1 * | 9/2014 | Khuti | ...................... | G06F 16/50 705/28 |
| 2015/0121244 A1 * | 4/2015 | Walls | .................... | G06F 3/0481 715/744 |

(Continued)

*Primary Examiner* — Ricky Q Ngo
*Assistant Examiner* — Michael K Phillips
(74) *Attorney, Agent, or Firm* — Harrity & Harrity, LLP

(57) ABSTRACT

In some possible implementations, a platform may receive or determine information identifying a plurality of physical network devices, wherein the plurality of physical network devices is associated with a plurality of resources; receive information identifying criteria for a topology, wherein a deployment based on the topology is to be configured using one or more resources, of the plurality of resources, associated with one or more physical network devices of the plurality of physical network devices, and wherein the criteria do not identify the one or more resources or the one or more physical network devices; select the one or more physical network devices or the one or more resources for the deployment based on the topology; and automatically configure the one or more resources or the one or more physical network devices to provide the deployment based on the topology.

20 Claims, 6 Drawing Sheets

(56) References Cited

U.S. PATENT DOCUMENTS

| | | | |
|---|---|---|---|
| 2015/0358391 A1* | 12/2015 | Moon | G06F 11/34 |
| | | | 709/224 |
| 2016/0157043 A1* | 6/2016 | Li | H04W 4/70 |
| | | | 370/254 |
| 2017/0245280 A1* | 8/2017 | Yi | H04K 3/00 |
| 2018/0062932 A1* | 3/2018 | Cohn | H04L 41/12 |
| 2018/0316730 A1* | 11/2018 | Schaefer | H04L 41/0803 |
| 2018/0336019 A1* | 11/2018 | Schmidt | G06F 16/252 |
| 2018/0373961 A1* | 12/2018 | Wang | G06K 9/6253 |
| 2019/0332422 A1* | 10/2019 | Liu | G06N 3/063 |

* cited by examiner

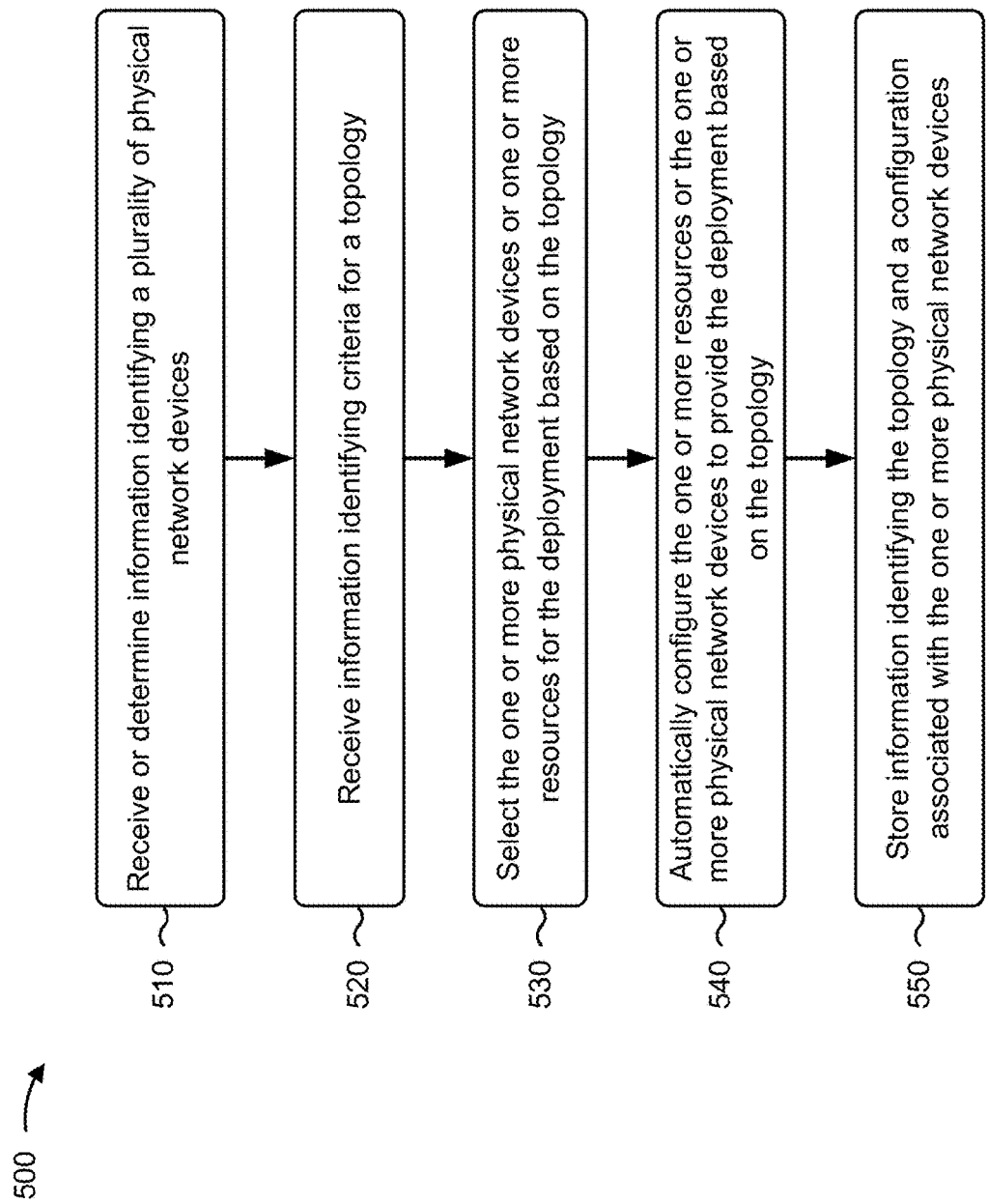

LAB RESOURCE PLATFORM

BACKGROUND

A network deployment may be provided using network devices, such as switches, routers, and/or the like. In some cases, a network device may be provided using one or more boards (e.g., line cards, field-replaceable units, etc.). For example, the network device may be a virtualized network device and may be provided using one or more physical network devices.

SUMMARY

In some possible implementations, a platform may include one or more memories and one or more processors. The one or more processors may receive or determine information identifying a plurality of physical network devices, wherein the plurality of physical network devices is associated with a plurality of resources; receive information identifying criteria for a topology, wherein a deployment based on the topology is to be configured using one or more resources, of the plurality of resources, associated with one or more physical network devices of the plurality of physical network devices, and wherein the criteria do not identify the one or more resources or the one or more physical network devices; select the one or more physical network devices or the one or more resources for the deployment based on the topology; and automatically configure the one or more resources or the one or more physical network devices to provide the deployment based on the topology.

In some possible implementations, a non-transitory computer-readable medium may store one or more instructions that, when executed by one or more processors of a platform, cause the one or more processors to receive or determine information identifying a plurality of physical network devices, wherein the plurality of physical network devices is associated with a plurality of resources, wherein the plurality of resources are logical representations of network devices implemented using the plurality of physical network devices; receive information identifying criteria for a topology, wherein a deployment based on the topology is to be configured using one or more resources, of the plurality of resources, associated with one or more physical network devices of the plurality of physical network devices, and wherein the criteria do not identify the one or more resources or the one or more physical network devices; select the one or more physical network devices or the one or more resources for the deployment based on the criteria; automatically configure the one or more resources or the one or more physical network devices to provide the deployment based on the topology; and store information identifying the topology and a configuration associated with the one or more physical network devices.

In some possible implementations, a method may include determining, by a platform, information identifying a plurality of physical network devices, wherein the plurality of physical network devices is associated with a plurality of resources, wherein the plurality of resources are logical representations of network devices implemented using the plurality of physical network devices; receiving, by the platform, information identifying criteria for a topology, wherein a deployment based on the topology is to be configured using one or more resources, of the plurality of resources, associated with one or more physical network devices of the plurality of physical network devices, and wherein the criteria do not identify the one or more resources or the one or more physical network devices; selecting, by the platform, the one or more physical network devices or the one or more resources for the deployment based on the criteria; automatically configuring, by the platform, the one or more resources or the one or more physical network devices to provide the deployment; and storing, by the platform, information identifying the topology and a configuration associated with the one or more physical network devices.

BRIEF DESCRIPTION OF THE DRAWINGS

FIG. 5 is a flow chart of an example process for configuring resources of managed devices using a lab resource platform.

DETAILED DESCRIPTION

Figure 1A:
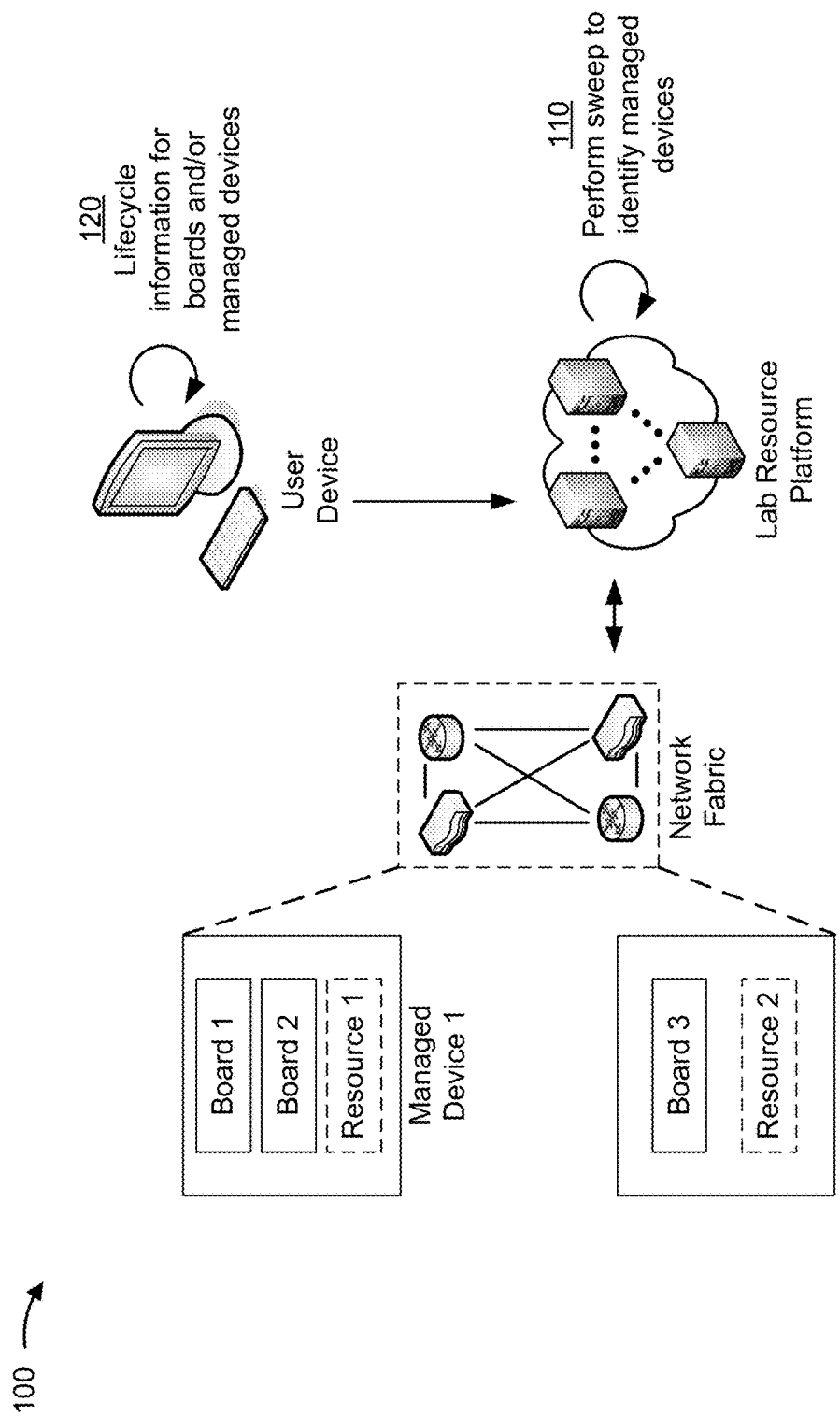
FIGS. 1A and 1B are diagrams of an example implementation described herein.

The following detailed description of example implementations refers to the accompanying drawings. The same reference numbers in different drawings may identify the same or similar elements.

Network resources may be provided using a set of physical network devices. In some cases, a physical network device may provide a virtual network device. For example, a physical network device may include a switch, a router, a set of line cards or field-replaceable units (FRUs) of a chassis, and/or the like. A virtual network device may include a virtual network function (VNF) or a similar function, such as a virtual router, a virtual switch, a virtual firewall, and/or the like. A network device may be associated with a physical network device (e.g., may be the physical network device or may be implemented using the physical network device) and may be identified as a resource. For example, a resource may be a logical representation of a network device, and a physical network device may be a physical representation of the network device (e.g., a board used to provide the network device). In other words, physical network devices may have a 1-to-many, a 1-to-1, or a many-to-1 relationship with resources. In some implementations, FRUs or line cards of a physical network device may be referred to herein as boards, although implementations described herein are not limited to those that use boards. In other words, the term board is used herein as a general term to refer to field-replaceable components of a network device, such as line cards, FRUs, and/or the like. In some cases, a network device (e.g., a physical network device or a virtual network device) or a resource may be referred to herein as a managed device.

A set of resources, and corresponding network devices associated with the resources, may be used to provide a deployment. For example, connections between network devices may be configured to provide desired connections between resources of the deployment. The deployment may be described by a topology, such as a network topology. The topology may describe a configuration and connections of resources and/or network devices of the deployment. For example, the topology may include information identifying nodes of the deployment and links between nodes of the deployment. In some aspects, the topology may be implemented based on configuring routers, switches, and/or other network devices of a network fabric. For example, the network fabric may be implemented using switches (e.g., physical switches and/or logical switches) to create the links required by a topology definition. In some cases, the topology may be configured by a user or administrator of the resources or network devices. For example, an administrator may administer a lab (e.g., a collection of physical network devices used to provide network functions and resources), and users may develop or test lab hardware using the physical network devices.

In some cases, it may be difficult to manage deployments that use physical network devices and resources implemented using the physical network devices. For example, it may be inefficient for a user to define a topology in accordance with physical device identifiers or resource names, since physical device identifiers and/or resource names may change frequently over time, and since the connections between resources or physical network devices may change frequently over time. Furthermore, it may be beneficial for users (e.g., administrators or users that use a lab to test network devices or resources) to determine lifecycle information for physical network devices of a lab. Still further, when multiple administrators or users are attempting to use resources provided by the same set of physical network devices, it may be difficult to properly apportion resources and/or physical network devices among the multiple administrators or users.

Some implementations described herein provide a lab resource platform that performs dynamic configuration of a deployment based on information identifying a topology. For example, the lab resource platform may automatically select and configure resources and/or physical network devices based on the information identifying the topology. In some implementations, the topology may not explicitly identify the resources or the physical network devices. For example, the lab resource platform may receive information identifying criteria of the topology, and may select appropriate resources and physical network devices in accordance with the criteria. Selecting the appropriate resources and physical network devices based on the criteria reduces reliance on user knowledge of resource names, network device identifiers, and so on. Also, the lab resource platform may be efficient in selecting the appropriate resources or physical network devices and, thus, may conserve resources that would otherwise be used for inefficient process. Furthermore, selecting resources and physical network devices based on the criteria may improve resource utilization for the deployment. For example, the resources and physical network devices may be selected based on availability and suitability for the deployment, which may improve resource utilization relative to using devices or resources specified by a designer of the topology.

Some implementations described herein may perform management, tracking, and configuration of resources assets and/or physical network devices using various services. For example, the lab resource platform may provide device lifecycle tracking and management, documentation of network device configurations, change or audit logging, device utilization information detection and logging, and/or the like, to provide a view of the lifecycle of an asset, such as a board or a managed device. This may be useful for testing purposes and may enable the logging of lifecycle information on a scale that would be difficult or impossible for a human to achieve. In some implementations, the lab resource platform may provide topology snapshotting, wherein the lab resource platform may capture a topology and a configuration of devices or resources of the corresponding deployment for subsequent restoration or implementation using other devices. Topology snapshotting may reduce the amount of time needed to re-deploy the deployment, which may conserve processor and network resources that would otherwise be used to manually configure the re-deployment. As another example, the lab resource platform may use a reservation system so that double-booking and inefficient resource utilization are reduced. As another example, the lab resource platform may provide power management services, wherein a device may be powered down, placed in a low power state, and/or the like based on utilization of the device. This may conserve power and reduce the amount of manual input required to perform power management of devices. In some cases, the managed devices might be spread over multiple labs in different geographical locations. The lab resource platform may perform the operations described herein as if all the managed devices are located in the same lab.

Figure 1B:
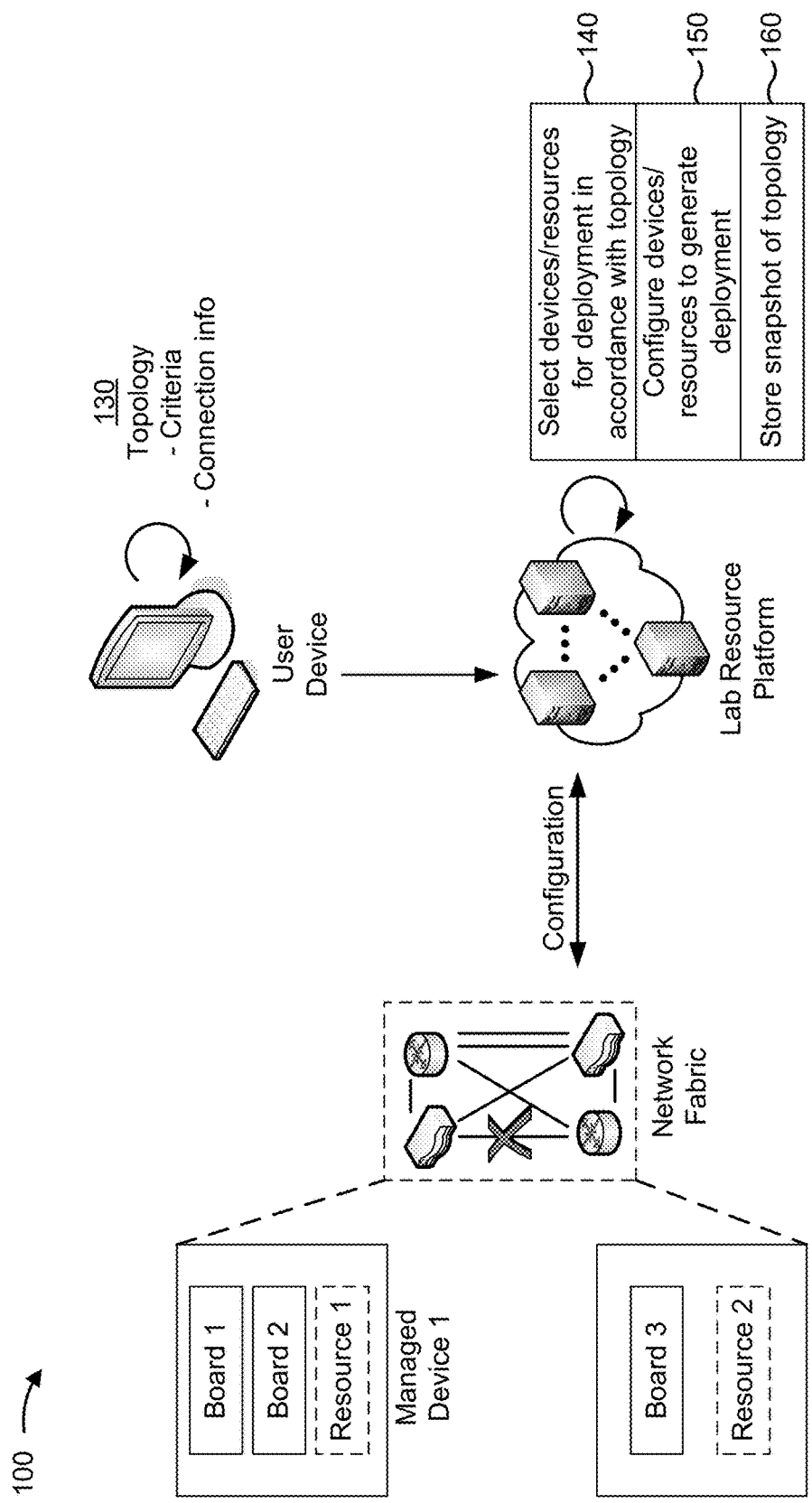

FIGS. 1A and 1B are diagrams of an example implementation 100 described herein. As shown, example implementation 100 may include a lab resource platform, a user device, and managed devices 1 and 2, which may be associated with boards 1, 2, and 3. Managed devices 1 and 2 may be physical network devices (e.g., supported by separate chasses, supported by the same chassis, etc.), and boards 1, 2, and 3 may be line cards, FRUs, and/or the like. As further shown, managed device 1 may be associated with a resource 1, and managed device 2 may be associated with a resource 2. For example, resources 1 and 2 may be implemented by managed devices 1 and 2, respectively. As shown, the lab resource platform may be connected with the managed devices by a network fabric. The lab resource platform may dynamically configure devices of the network fabric (e.g., routers, switches, Layer 1 devices, Layer 2 devices, etc.) to provide a deployment in accordance with a topology definition, as described in more detail elsewhere herein. The network fabric may be implemented across one or more labs (e.g., using physical network devices and/or virtual network devices of the one or more labs) or using devices not associated with any lab (e.g., routers, switches, etc.). In some cases herein, a resource may be referred to as a managed device. For example, a resource may be a logical representation of a network device, which may be a physical or virtual network device.

As shown in FIG. 1A, and by reference number 110, the lab resource platform may perform a sweep (e.g., a sweep procedure). For example, the sweep may be a procedure for detecting or probing managed devices to determine which managed devices are active or available, configurations of the managed devices, locations of the managed devices, locations of boards of managed devices, and/or the like. The lab resource platform may perform the sweep by attempting to access managed devices, querying the managed devices for status information, and/or the like, as described in more detail elsewhere herein.

The lab resource platform may perform the sweep to identify the managed devices 1 and 2. For example, the lab resource platform may identify a physical network device and/or a virtual network device (either of which may be associated with or may provide a resource) as part of the sweep. As another example, the lab resource platform may identify a set of boards as part of the sweep. For example, the lab resource platform may identify each board (e.g., line card, FRU, etc.) that is connected to a chassis.

As shown by reference number 120, the lab resource platform may receive lifecycle information for the boards and/or the managed devices. For example, the lab resource platform may receive the lifecycle information from a user device. In some implementations, the lab resource platform may determine the lifecycle information (e.g., based on querying a board or managed device), may look up the lifecycle information in a data structure, and/or may receive the lifecycle information from a board or managed device. In some implementations, the lifecycle information may identify a board design, a modification, a board fabrication, a board assembly, and/or the like. In some implementations, the lab resource platform may receive other information associated with a board or managed device, such as information identifying a geographical location of a board or managed device, a lab associated with a board or managed device, a rack or chassis size, a rack or chassis location, a model number, a serial number, a business identifier (e.g., information identifying a business group, a business unit, a department, and/or the like), a set of boards associated with the managed device, a state of the managed device (e.g., reserved, unreserved, powered on, powered off, a utilization value, etc.), connection information, management ports, power ports, and/or the like. In this way, the lab resource platform may provide lifecycle tracking for managed devices, which may be useful for testing and research purposes.

In some implementations, the lab resource platform may gather at least part of the lifecycle information, which may reduce human input and therefore improve accuracy of the lifecycle information. Automatically gathering the lifecycle information may also increase the number of managed devices for which lifecycle information can be tracked or gathered in comparison to manually gathering lifecycle information. In some implementations, the lab resource platform may receive at least part of the lifecycle information based on a user input, which may increase a breadth of the lifecycle information that can be tracked by the lab resource platform.

In some implementations, the lab resource platform may track a board. For example, the lab resource platform may determine that a board is switched from a first chassis to a second chassis. In such a case, the lab resource platform may store lifecycle information indicating that the board was previously associated with the first chassis and is now associated with the second chassis. In some implementations, the lab resource platform may store information associated with the board, the first chassis, or the second chassis, such as information identifying a length of time that the board was associated with the first chassis or the second chassis, geographical information, information identifying a lab or administrator associated with the first chassis and/or the second chassis, and/or the like. In this way, the lab resource platform provides tracking of lifecycle information for boards of the managed devices, thereby providing improved information for testing of boards. This may be particularly useful for experimental or customized boards that may be switched between different managed devices.

As shown in FIG. 1B, and by reference number 130, the lab resource platform may receive information identifying a topology. For example, the lab resource platform may receive the information identifying the topology (e.g., criteria for the topology) from a user device. In some implementations, the lab resource platform (and/or the user device) may provide a graphical user interface for specifying the topology. For example, a user may define the topology as nodes and links between the nodes using the graphical user interface, and the lab resource platform may determine criteria for the topology based on the nodes and the links between the nodes. In some implementations, a parameter may include, for example, a connection type, a connection bandwidth, an object type (e.g., switch, router, firewall, etc.), an object location, a required latency, a required security feature, and/or the like. For example, criteria for the topology may identify one or more criteria for inclusion of physical network devices or resources in the deployment. In some implementations, the lab resource platform may receive the information identifying the topology in another form, such as a code form, a meta-code form, a command line input, and/or the like.

In some implementations, the topology may not identify particular resources or devices. For example, the topology may not identify a resource name, network address, physical device identifier, and/or the like. This may provide increased flexibility for the configuration of the deployment using available resources (e.g., in comparison to resources specified by the topology), and may reduce the reliance on user knowledge of particular resources or devices. Furthermore, creating a topology without specifying particular resources or devices may be faster than specifying particular resources or devices, thereby saving processor, memory, and/or network resources.

As shown by reference number 140, the lab resource platform may select devices and/or resources for deployment in accordance with the topology. For example, the lab resource platform may determine criteria of the topology based on the information identifying the topology, or the lab resource platform may receive information identifying the criteria. The lab resource platform may identify available resources that can be used to provide a deployment that conforms with the criteria of the topology. For example, the lab resource platform may identify resources that satisfy required object types or nodes of the topology. The lab resource platform may determine connections for the resources that satisfy requirements for the links of the topology. In some implementations, the lab resource platform may identify resources based on a most efficient resource allocation. For example, the lab resource platform may identify multiple, different resource allocations for the topology, and may select a set of resources or physical network devices based on maximizing a criterion (e.g., resource utilization, throughput, reliability, etc.). In some implementations, the lab resource platform may determine that a resource is to be deployed based on the topology. For example, the topology may call for a virtual machine or a virtual network device to be deployed. As another example, the lab resource platform may determine that a particular resource of the topology is not currently configured, and may deploy a virtual machine or a virtual network device as the particular resource. In this way, the lab resource platform may improve efficiency of implementation of the topology by automatically deploying a virtual machine or a virtual network device, which reduces manual intervention in deployment of the topology. Furthermore, automatically deploying the virtual machine or the virtual network device may improve resource utilization of the deployment in comparison to using a dedicated network device to provide the function of the virtual machine or the virtual network device.

In some implementations, the lab resource platform may select particular resources or managed devices for the deployment based on a reservation. For example, the lab resource platform may determine that the topology is associated with a particular user (e.g., a particular user account associated with the particular user). The particular user may be associated with a reservation for a resource, device, and/or the like. In some implementations, the reservation may be associated with a particular geographic location, a particular lab, a particular set of devices, a particular type of device, a particular service level (e.g., a managed device and/or connection that can provide the particular service level), a particular amount of resources (e.g., bandwidth, latency, throughput, etc.), and/or the like. The lab resource platform may select only resources or managed devices that are reserved for the particular user, thereby improving resource utilization and reducing collisions associated with resources or devices that are allocated for multiple users or deployments.

As shown by reference number 150, the lab resource platform may configure the devices and/or resources to generate or provide the deployment. For example, the lab resource platform may configure connections within and between the managed devices to provide the links specified by the topology, and may configure resources (e.g., virtual network devices or physical network devices) to provide the nodes of the topology. As shown, the lab resource platform may configure the network fabric and/or provide configuration information to the managed devices to generate the deployment. For example, the lab resource platform may use an application programming interface, a command line, a management port, and/or the like to configure the devices and/or resources. In some implementations, the lab resource platform may configure the managed devices in a multi-threaded fashion, which reduces a length of time and an amount of network resources that would otherwise be used to configure the managed devices.

In some implementations, the lab resource platform may dynamically select the managed devices and/or provide the deployment. For example, resource reservations, device reservations, and device utilization can change over time. The lab resource platform may determine an updated set of devices or resources, or may determine an updated network fabric configuration for a topology, and may configure the updated set of devices or resources or the network fabric to provide the corresponding deployment. In this way, the lab resource platform may provide flexibility in the face of changing device utilization and reservation, thereby improving resource utilization and network efficiency.

As shown by reference number 160, the lab resource manager may store a snapshot of the topology or the deployment. The snapshot may identify selected resources and managed devices, the topology, configurations of the selected resources and managed devices, builds for the managed devices, and/or the like, as described in more detail elsewhere herein. The snapshot may enable subsequent restoration of the deployment using the same managed devices or different managed devices. This may save time and configuration resources in comparison to manually implementing the deployment on the same device or different devices. As just one example, it may be expected to take between ten and twenty times longer to manually implement the deployment than to implement the deployment using a snapshot.

In this way, the lab resource platform may select devices and resources for a deployment in a dynamic fashion based on criteria of a topology, which improves flexibility and efficiency of resource allocation and reduces reliance on user knowledge of identities of devices or resources. Furthermore, the devices and resources for the deployment may not be specified as part of the topology. Still further, the lab resource platform may store lifecycle information for the managed devices of the deployment, and may provide tracking of boards when boards are switched from one device to another. By automatically tracking the switching of boards from one device to another, the lab resource platform may reduce human error in such tracking, and may enable the tracking of quantities of boards that may be difficult or impossible for a human to achieve.

As indicated above, FIGS. 1A and 1B are provided merely as an example. Other examples are possible and may differ from what was described with regard to FIGS. 1A and 1B.

Figure 2:
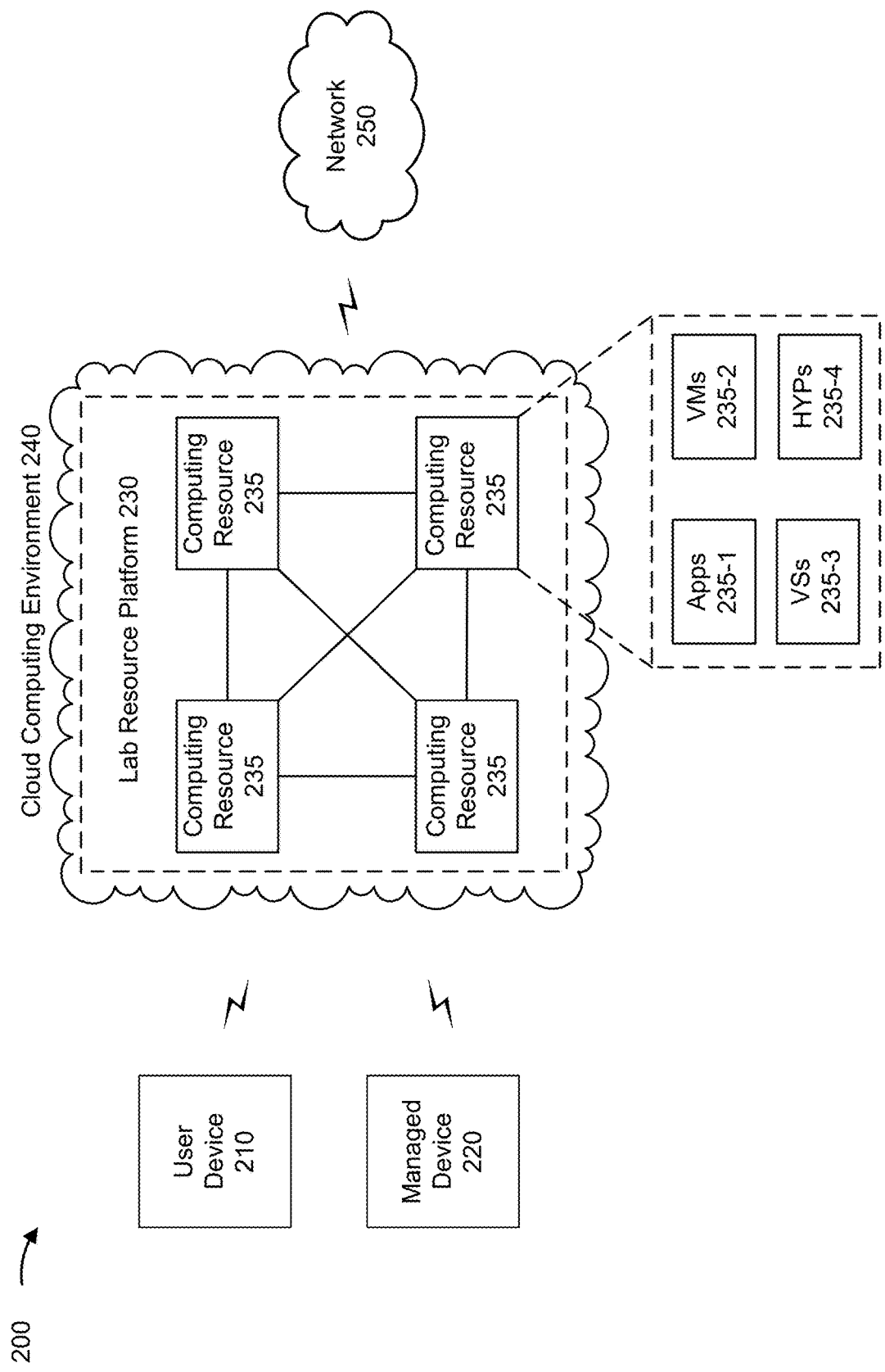
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a managed device 220, a lab resource platform 230, a computing resource 235, a cloud computing environment 240, and a network 250. Devices of environment 200 may interconnect via wired connections, wireless connections, or a combination of wired and wireless connections.

User device 210 includes one or more devices capable of receiving, generating, storing, processing, and/or providing information associated with managing a set of resources or a physical network device. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Managed device 220 includes one or more devices to be managed by lab resource platform 230. For example, managed device 220 may include a physical network device, a board (e.g., a line card, a FRU, etc.), and/or the like. In some implementations, a virtual network device may be provided by managed device 220. Additionally, or alternatively, a virtual network device and/or a resource may be referred to herein as a managed device 220.

Lab resource platform 230 includes one or more computing resources assigned to managing managed devices 220. For example, lab resource platform 230 may be a platform implemented by cloud computing environment 240 that may provide deployments, configure or monitor managed devices 220, store information associated with managed devices 220, and/or perform maintenance for managed devices 220. In some implementations, lab resource platform 230 is implemented by computing resources 235 of cloud computing environment 240.

Lab resource platform 230 may include a server device or a group of server devices. In some implementations, lab resource platform 230 may be hosted in cloud computing environment 240. Notably, while implementations described herein describe lab resource platform 230 as being hosted in cloud computing environment 240, in some implementations, lab resource platform 230 may not be cloud-based or may be partially cloud-based.

Cloud computing environment 240 includes an environment that delivers computing as a service, whereby shared resources, services, etc. may be provided to lab resource platform 23. Cloud computing environment 240 may provide computation, software, data access, storage, and/or other services that do not require end-user knowledge of a physical location and configuration of a system and/or a device that delivers the services. As shown, cloud computing environment 240 may include lab resource platform 230 and computing resource 235.

Computing resource 235 includes one or more personal computers, workstation computers, server devices, or another type of computation and/or communication device. In some implementations, computing resource 235 may host lab resource platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by user device 210. Application 235-1 may eliminate a need to install and execute the software applications on user device 210. For example, application 235-1 may include software associated with lab resource platform 230 and/or any other software capable of being provided via cloud computing environment 240. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., user device 210), and may manage infrastructure of cloud computing environment 240, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some implementations, managed device 220 may be a physical device implemented within a housing, such as a chassis. In some implementations, managed device 220 may be a virtual device implemented by one or more computer devices of a cloud computing environment or a data center.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
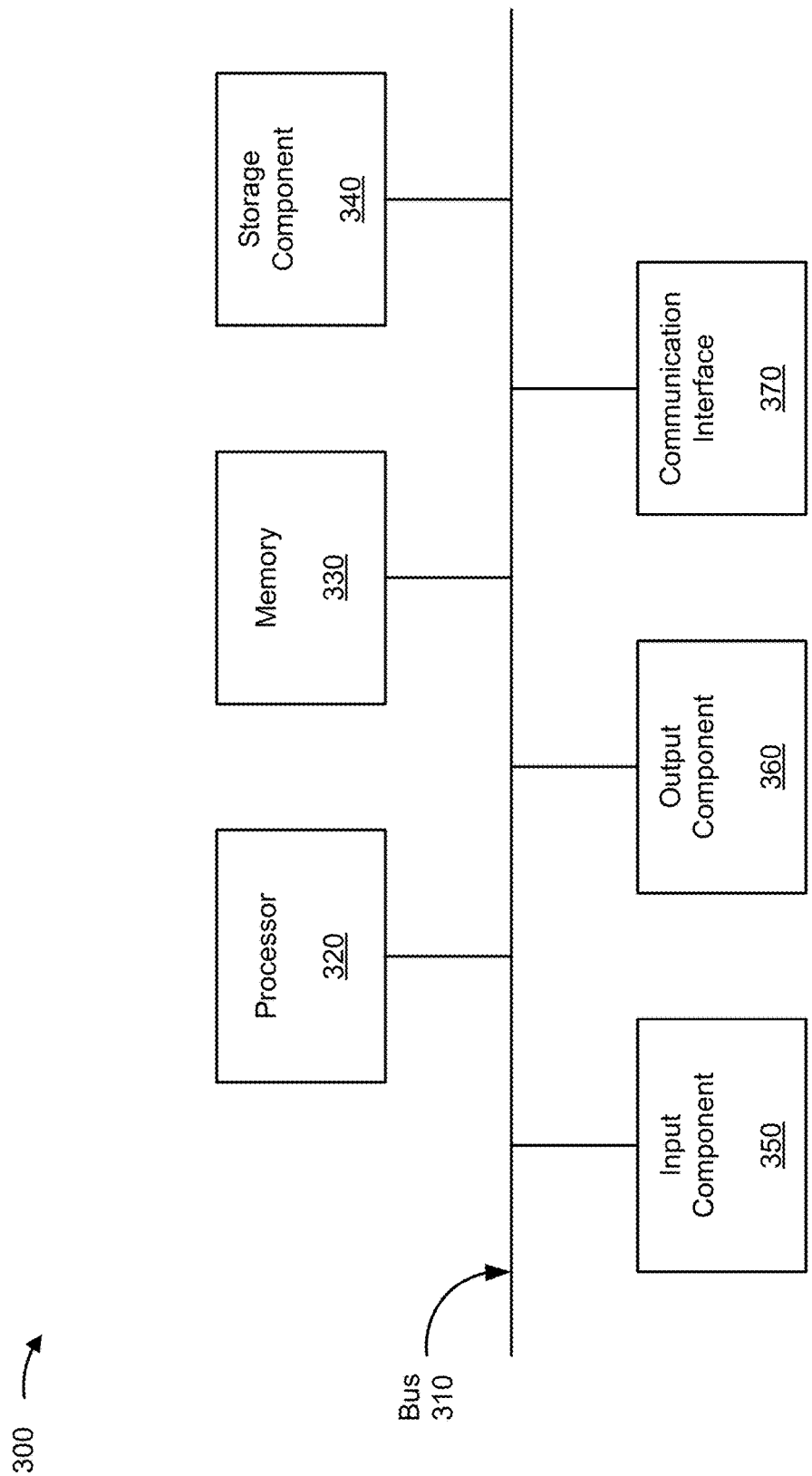
FIG. 3 is a diagram of example components of one or more devices of FIG. 2.

FIG. 3 is a diagram of example components of a device 300. Device 300 may correspond to user device 210, managed device 220, lab resource platform 230, and/or computing resource 235. In some implementations, user device 210, managed device 220, lab resource platform 230, and/or computing resource 235 may include one or more devices 300 and/or one or more components of device 300. As shown in FIG. 3, device 300 may include a bus 310, a processor 320, a memory 330 (e.g., one or more memories), a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
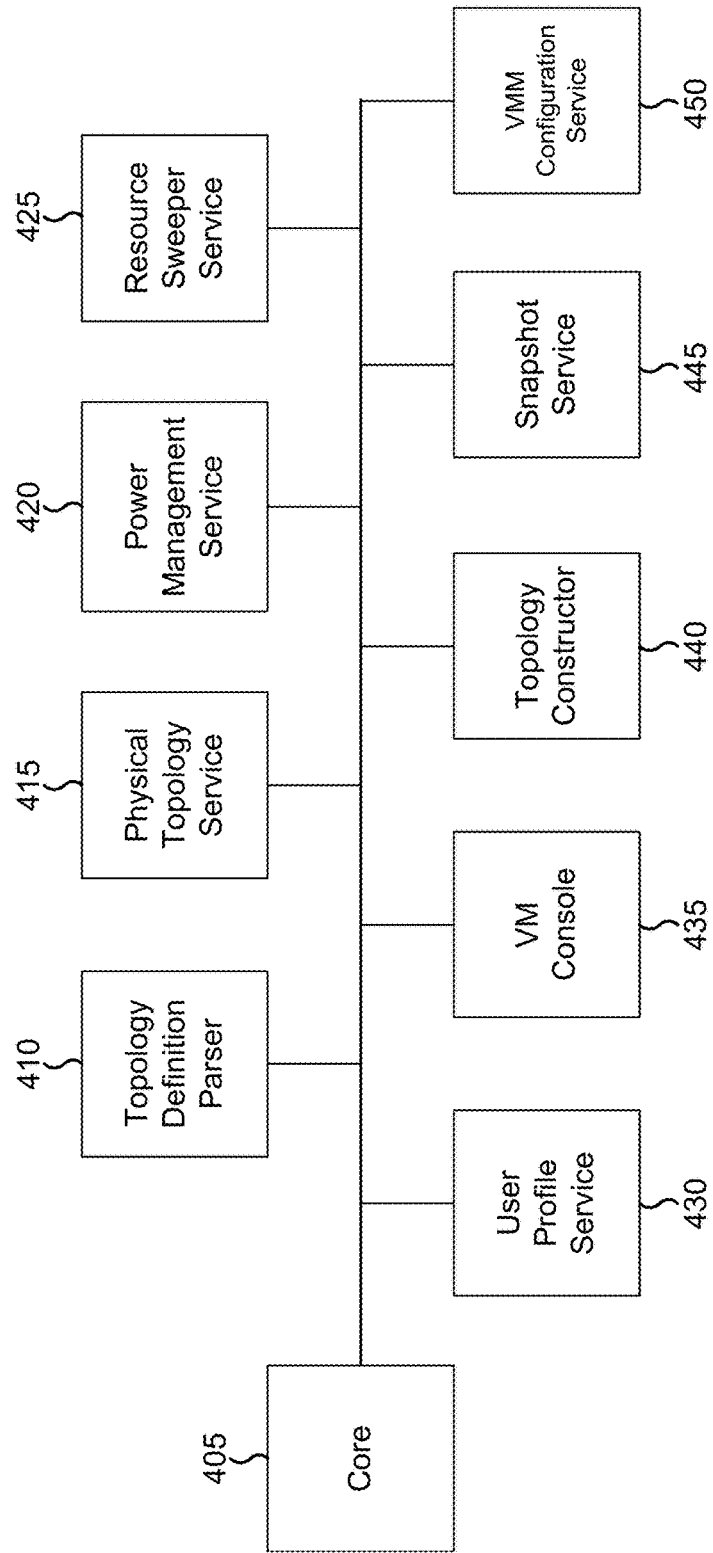
FIG. 4 is a diagram of example services of a lab resource platform described herein.

FIG. 4 is a diagram of example services of lab resource platform 230 described herein. As shown, lab resource platform 230 may include a core 405, a topology definition parser 410, a physical topology service 415, a power management service 420, a resource sweeper service 425, a user profile service 430, a VM console 435, a topology constructor 440, a snapshot service 445, and/or a VMM configuration service 450. These components may be implemented in hardware, firmware, or a combination of hardware and software. In some aspects, the services, provided by these components, may be modules, components, and/or the like.

Core 405 may provide intercommunication between other components or services of lab resource platform 230. For example, core 405 may handle communication, coordination, and/or the like between the services of lab resource platform 230. In some aspects, core 405 may include an operating system, a kernel, and/or the like.

Topology definition parser 410 may parse information identifying criteria for a topology, and may provide information to topology constructor 440 identifying the criteria. In some implementations, topology definition parser 410 may identify or parse criteria relating to another service of lab resource platform 230, such as power management service 420, VM console 435, and/or the like.

As just one simple example, the information identifying the criteria may be based on the following code:

```
r0 {
  system {
    x-my-is-vm "true";
    vm-deploy-model "vmx";
  }
  interfaces {
    r0-r1_0 {
    }
  }
}
r1 {
  system {
    x-my-is-vm "true";
    vm-deploy-model "vmx";
  }
  interfaces {
    r0-r1_0 {
    }
  }
}
```

Of course, other examples are possible and may differ from the code provided above.

Physical topology service 415 may determine, provide, and/or store information relating to physical topologies associated with managed device 220. For example, physical topology service 415 may determine, provide, and/or store information indicating infrastructure connections, switch connections, management ports, power ports, net-planes, and/or the like. In some implementations, physical topology service 415 may provide this information to another service (e.g., topology constructor 440, power management service 420, etc.).

Power management service 420 may perform power management for managed devices 220. For example, power management service 420 may collect, store, and/or provide information relating to utilization (e.g., reservation frequency, network traffic, average CPU load, configuration churn, disk activity, etc.). Power management service 420 may use the information relating to utilization to automatically identify managed devices 220 that can be deactivated or set to a low power mode and/or may deactivate or set a managed device 220 to a low power mode, which may be referred to herein as automatic power management. In some implementations, criteria or thresholds for automatic power management may be configurable (e.g., at the lab level, at the device level, using lab resource platform 230, etc.). In this way, power management service 420 may improve efficiency and reduce power consumption of managed devices 220.

In some implementations, power management service 420 may determine or receive information indicating that a managed device 220 is to be excluded from automatic power management. This may be useful for equipment that is required to be on-site or activated due to contractual obligations. In some implementations, power management service 420 may interact with a power distribution unit (PDU). Power management service 420 may use a variety of methods to safely power down devices (e.g., based on information provided by administrators), which improves safety of power cycling devices.

In some implementations, lab resource platform 230 may provide power management service 420 on-demand (e.g., via a user interface). For example, lab resource platform 230 may receive information (e.g., based on a user interaction) indicating that a managed device 220 is to be activated, deactivated, or power cycled. Lab resource platform 230 may activate, deactivate, or power cycle the managed device 220. In some implementations, lab resource platform 230 may determine whether the user associated with the user interaction has reserved the managed device 220, and may perform the power management operation only when the user has reserved the managed device 220. This may improve resource utilization and reduce the likelihood of an unauthorized modification of managed device 220.

Resource sweeper service 425 may perform a sweep procedure or a sweep process to determine information relating to managed devices 220. For example, resource sweeper service 425 may detect (e.g., auto-detect) hardware components of physical network devices. Resource sweeper service 425 may attempt to log into managed devices 220 or resources associated with managed devices 220. In some implementations, resource sweeper service 425 may create or populate an inventory of managed devices 220 (e.g., boards, chasses, etc.) that are detected or inspected by resource sweeper service 425. For example, resource sweeper service 425 may store chassis component information, operating system (OS) information, device health information, and/or the like. In some implementations, resource sweeper service 425 may determine that a managed device 220 is unreachable, is currently reserved, is currently powered off, and/or the like, and may provide such information (e.g., in a stoplight-like format, using a user interface, etc.). This simplifies device documentation and provides device information for hundreds, thousands, or tens of thousands of devices, which may be impossible for a human actor to provide in a timely fashion.

User profile service 430 may store, provide, and/or manage information associated with user profiles, such as roles, preferences, permissions, group permissions, and/or the like. For example, a user profile may be associated with a particular role (e.g., super admin, admin, lead, user, etc.). Each role may have access to particular features of lab resource platform 230 (e.g., designating users of lower roles, adding or modifying chassis or managed devices 220, adding or modifying network connections, adding or modifying reservations, reserving devices, manipulating reserved devices, and/or the like). Lab resource platform 230 may provide access to services and/or managed devices 220 based on the user profile associated with a user or user interaction. For example, lab resource platform 230 may determine the user profile using user profile service 430, and may accordingly provide a particular service based on whether the user profile permits access to the particular service. As another example, lab resource platform 230 may identify reservations associated with a user profile, and may provide access only to managed devices 220 that are identified by the reservations (e.g., for a deployment, for management of the managed devices 220, etc.).

VM console 435 may provide a link to a VM hypervisor to allow a user to access a pre-deployed VM via a terminal session.

Topology constructor 440 may generate a deployment or network connection based on information identifying a topology. For example, topology constructor 440 may receive information identifying a topology (e.g., based on a user interaction, such as a user interaction with a graphical user interface). In some implementations, the information identifying the topology may identify criteria such as connection bandwidth, security features, ports to be used, features to be provided, and/or the like. Topology constructor 440 may generate a deployment based on the information identifying the topology. For example, topology constructor 440 may communicate with switches and managed devices 220 to create network connections based on the topology. In some implementations, topology constructor 440 may select switches, resources, and/or managed devices 220 for a deployment based on the information identifying the topology. In some implementations, the information identifying the topology may use a language or a meta-language associated with a network definition.

In some implementations, topology constructor 440 may deploy (or cause VM console 435 to deploy) a virtual machine based on information identifying a topology. For example, topology constructor 440 may determine that a virtual machine is to be deployed based on information identifying the topology, and may deploy the virtual machine based on determining that the virtual machine is to be deployed. In some implementations, topology constructor 440 may generate a virtual machine manager (VMM) definition to permit at least part of the topology to be deployed using a VMM command line. In some implementations, topology constructor 440 may power cycle a managed device 220, dynamically create an individual network connection, specify a selection criterion for a node or link with regard to a topology, and/or the like. In some implementations, topology constructor 440 may provide a view of a deployment or topology, such as a physical view of connections or nodes of the deployment or topology. For example, the view may identify a network infrastructure and/or the managed devices 220 involved in resolving the topology.

Snapshot service 445 may store information identifying a topology and configuration associated with the topology (referred to herein as a snapshot) for restoration or re-deployment. A snapshot may include the topology definition, the configuration of managed devices 220 used for the deployment associated with the topology, a build image name and location, and/or the like. Lab resource platform 230 may store the snapshot so that the topology or deployment can be rebuilt automatically, which may be quicker and more efficient than a manual topology rebuilding procedure. For example, the process of automatically rebuilding a topology or deployment using a snapshot may be approximately 10 to 20 times quicker than manually rebuilding a topology or deployment. Furthermore, the snapshot service may permit the storing and sharing of deployments, such as customer or test deployments. In some implementations, lab resource platform 230 may transplant a topology to another set of virtual or physical devices (e.g., managed devices 220). This may be useful for testing a deployment on another set of physical network devices, quickly re-deploying a deployment, and/or the like.

VMM configuration service 450 may provide deployment, configuration, and interaction for virtual machines (e.g., resources or network devices that are implemented using virtual machines). For example, VMM configuration service 450 may deploy a virtual machine as part of a deployment, may enable user interaction with virtual machines, may perform power management for virtual machines, and/or the like.

In some implementations, lab resource platform 230 may provide an account management service (not shown in FIG. 4). For example, many of the actions performed by lab resource platform 230 may require root-level access to managed device 220. Lab resource platform 230 may provide secure documentation of various accounts and permission levels for the accounts. Lab resource platform 230 may use an appropriate account when shell or root-level access to a managed device 220 is required. For example, a service that uses root-level access (e.g., resource sweeper service 425, power management service 420, topology constructor 440, and/or the like) may use the appropriate account to gain root-level access. In this way, lab resource platform 230 provides secure management of root-level access to managed device 220, which reduces user interaction with managed device 220, thereby improving efficiency and security.

In some implementations, lab resource platform 230 may provide a utilization metric service (not shown in FIG. 4). For example, lab resource platform 230 may collect, query for, or receive network traffic data from Layer 2 switches, data related to disk and memory use, configuration churn information (e.g., information indicating how often and/or in what manner a configuration of a device changes), and/or the like. This information may be used to determine whether reserved devices are being utilized. For example, lab resource platform 230 may use this information to determine when to "auto-retire" managed device 220 (e.g., using power management service 420 or the auto-retirement service described below), which may save resources and/or space in a lab.

In some implementations, lab resource platform 230 may provide an auto-retirement service (not shown in FIG. 4). For example, lab resource platform 230 may determine that managed device 220 is to be auto-retired, meaning that managed device 220 can be reassigned to another reservation or team, can be removed from a lab, can be powered down, and/or the like. Lab resource platform 230 may determine that managed device 220 is to be auto-retired based on an inspection period and/or a utilization threshold. When the utilization threshold is not satisfied for a length of the inspection period, then lab resource platform 230 may determine that managed device 220 is to be auto-retired. The length of the inspection period and utilization threshold may be configurable parameters, and may be configurable on a lab-by-lab basis. If lab resource platform 230 determines that managed device 220 is under-utilized (e.g., according to the default utilization threshold or a threshold set for the lab in which managed device 220 resides), lab resource platform 230 may perform one or more actions, such as the example set of actions described below. First, managed device 220 may be powered down. If managed device 220 remains unused, all reservations for managed device 220 may be cancelled and a permission group of managed device 220 may be changed to users-all, which may allow anyone to reserve the device. If managed device 220 remains under-utilized, the state of managed device 220 may be changed to auto-retired, which makes managed device 220 eligible for re-assignment to another team or removal from a lab associated with managed device 220. Thus, resource utilization of managed devices 220 is improved by providing more permissive use of under-utilized devices.

In some implementations, lab resource platform 230 may provide an audit-logging service (not shown in FIG. 4). For example, lab resource platform 230 may determine and/or store a log of changes to managed device 220 using the user interface of lab resource platform 230 or a command-line interface of lab resource platform 230. Lab resource platform 230 may store the log of changes for a chassis, a resource, a board of a chassis, and/or the like. Lab resource platform 230 may capture changes to network connections, definitions of device types, and/or the like. In some implementations, lab resource platform 230 may provide log information (e.g., based on a user interface query, a command line interpreter query, and/or the like). The audit-logging service may be useful for testing or troubleshooting boards or managed devices 220. Furthermore, by automatically determining the log of changes, lab resource platform 230 may provide audit logging for a volume of devices that may be difficult or impossible for a human actor to provide.

In some implementations, lab resource platform 230 may provide a command line interpreter (CLI) service (not shown in FIG. 4). For example, the CLI service may perform batch or mass updates to object definitions (e.g., for managed device 220, a resource, a chassis, a board, etc.), user interface operations (e.g., operations that can also be performed using a user interface), management device model definitions, batching of operations, management of site, room, lab, or rack reservations, and/or the like. Thus, processor resources of lab resource platform 230 may be conserved that would otherwise be used to perform the above operations less efficiently (e.g., in a non-mass fashion, using a graphical user interface, and/or the like).

In some implementations, lab resource platform 230 may provide a build image service and/or a configuration management service (not shown in FIG. 4). For example, lab resource platform 230 may be configured to interface with managed device 220 in multiple ways. Lab resource platform 230 may install new build images, such as on managed device 220. In some implementations, lab resource platform 230 may create, modify or amend configuration files on managed device 220.

In some implementations, lab resource platform 230 may provide a user interface for build image selection (not shown in FIG. 4). For example, the user interface may permit a user to select a build image that is made available through a build image registry of lab resource platform 230. In some cases, a build image may be a toxic image, meaning that the build image may be undesirable or misconfigured for some reason. Lab resource platform 230 may provide for toxic images to be marked in the build image registry. Lab resource platform 230 may prohibit toxic images from installation on managed device 220, thereby improving network security and performance. In some implementations, lab resource platform 230 may receive information (e.g., a user interaction) identifying a location from which to install an image (e.g., an unreleased image), which may be useful when testing a fix for a known problem.

In some implementations, lab resource platform 230 may configure multiple managed devices 220 using a particular build image, which may be particularly useful when managing large labs. For example, lab resource platform 230 may use a multi-threaded approach to configure multiple managed devices 220, meaning that upgrading multiple devices is possible in approximately the same amount of time required to update a single device. Thus, efficiency of deploying builds to managed devices 220 is improved. Furthermore, lab resource platform 230 may provide configuration files for managed device 220, and may store information identifying the configuration files, thereby providing tracking of configurations of managed device 220.

In some implementations, lab resource platform 230 may provide searching of managed device 220. For example, a lab environment may include hundreds, thousands, or tens of thousands of devices to be managed. It may be beneficial to provide capabilities for users to find appropriate devices for development or testing. Lab resource platform 230 may provide a simpler search functionality or a more complex search functionality. For the simpler search functionality, lab resource platform 230 may search names of resources or devices (e.g., resources, chasses, boards, etc.). For the more complex search functionality, lab resource platform 230 may provide searching of object type-specific fields. Thus, lab resource platform 230 may provide a search functionality for managed device 220 in a simpler fashion, which may conserve processor resources in comparison to the more complex functionality, and/or in a more complex fashion, which may allow for more specific or granular searching.

In some implementations, lab resource platform 230 may provide console access for managed device 220. For example, lab resource platform 230 may provide a link to a console for managed device 220 in a search result that identifies managed device 220. In such a case, lab resource platform 230 may launch a terminal for managed device 220, such as a web-based terminal emulator. In some implementations, lab resource platform 230 may provide access to a console server. In such a case, console server ports for the console server may be documented as a console interface for a given managed device 220. By providing console access for managed device 220, lab resource platform 230 conserves network resources, processor resources, and time that would otherwise be used for interfacing directly with managed device 220 using a console of managed device 220.

As indicated above, FIG. 4 is provided as an example. Other examples are possible and may differ from what was described in connection with FIG. 4.

FIG. 5 is a flow chart of an example process 500 for configuring resources of managed devices using a lab resource platform. In some implementations, one or more process blocks of FIG. 5 may be performed by a platform such as a lab resource platform (e.g., lab resource platform 230). In some implementations, one or more process blocks of FIG. 5 may be performed by another device or a group of devices separate from or including the lab resource platform, such as user device 210 or managed device 220.

As shown in FIG. 5, process 500 may include receiving or determining information identifying a plurality of physical network devices (block 510). For example, the lab resource platform (e.g., using processor 320, resource sweeper service 425, and/or the like) may receive or determine information identifying a plurality of physical network devices (e.g., managed device 220). The plurality of physical network devices may be associated with a plurality of resources. For example, the plurality of resources may be logical representations of network devices implemented using the plurality of physical network devices.

As further shown in FIG. 5, process 500 may include receiving information identifying criteria for a topology (block 520). For example, the lab resource platform (e.g., using processor 320, topology definition parser 410, and/or the like) may receive information (e.g., from a user device such as user device 210) identifying criteria for a topology. A deployment based on the topology may be configured using one or more resources, of the plurality of resources, associated with one or more physical network device of the plurality of physical network devices. In some implementations, the criteria do not identify the one or more resources or the one or more physical network devices.

As further shown in FIG. 5, process 500 may include selecting the one or more physical network devices or one or more resources for the deployment based on the topology (block 530). For example, the lab resource platform (e.g., using processor 320, topology constructor 440, and/or the like) may select one or more physical network devices or one or more resources for the deployment based on the criteria. In some implementations, the lab resource platform may select resources and/or physical network devices that satisfy link and/or node criteria identified by the topology. In some implementations, the lab resource platform may select the resources and/or physical network devices dynamically.

As further shown in FIG. 5, process 500 may include automatically configuring the one or more resources or the one or more physical network devices to provide the deployment based on the topology (block 540). For example, the lab resource platform (e.g., using processor 320, topology constructor 440, and/or the like) may automatically configure the one or more resources and the one or more physical network devices to provide the deployment based on the topology. In some implementations, the lab resource platform may configure the one or more resources and the one or more physical network devices to provide the deployment based on the topology. In this way, the lab resource platform may improve efficiency of providing the deployment. In some implementations, the lab resource platform may reconfigure the one or more resources and the one or more physical network devices (e.g., when the topology is determined dynamically).

As further shown in FIG. 5, process 500 may include storing information identifying the topology and a configuration associated with the one or more physical network devices (block 550). For example, the lab resource platform (e.g., using processor 320, snapshot service 445, and/or the like) may store information identifying the topology and a configuration associated with the one or more physical network devices. In some implementations, the lab resource platform may store information identifying a configuration associated with the one or more resources. In some implementations, this information and/or other information described elsewhere herein may be referred to as a snapshot.

Process 500 may include additional implementations, such as any single implementation or any combination of implementations described below and/or in connection with one or more other processes described elsewhere herein.

In some implementations, the criteria for the topology identify one or more criteria for inclusion of physical network devices or resources in the deployment. In some implementations, the lab resource platform may store information identifying the topology associated with the one or more resources and a configuration associated with the one or more resources. In some implementations, the lab resource platform may select the one or more resources based on a reservation associated with the one or more resources or the one or more physical network devices.

In some implementations, the information identifying the plurality of physical network devices is received based on a sweep procedure performed by the platform to determine the information identifying the plurality of physical network devices. In some implementations, the information identifying the plurality of physical network devices identifies a module associated with a first physical network device of the plurality of physical network devices. The lab resource platform may determine that the module has changed to be associated with a second physical network device of the plurality of physical network devices; and store information indicating that the module was previously associated with the first physical network device and is now associated with the second physical network device.

In some implementations, the one or more resources include a virtual machine to be deployed as part of the deployment. In some implementations, the topology is defined using a graphical user interface. In some implementations, the lab resource platform may modify a power state of the one or more physical network devices. In some implementations, the lab resource platform may provide information identifying a graphical representation of the deployment. In some implementations, the information identifying the graphical representation identifies a resource, of the one or more resources, associated with a physical network device of the one or more physical network devices. In some implementations, the lab resource platform may provide the deployment using a set of physical network devices other than the one or more physical network devices based on the information identifying the topology and the configuration. In some implementations, the information identifying the criteria does not identify a particular device or resource.

In some implementations, the information identifying the plurality of devices identifies at least one of: a geographical location of a physical network device of the plurality of physical network devices, a lab associated with the physical network device, an identifier of the physical network device, a resource implemented using the physical network device, a business identifier for the physical network device, a state, or a facility associated with the physical network device.

In some implementations, the lab resource platform may provide information identifying the one or more resources used for the deployment. In some implementations, the lab resource platform may determine that a virtual machine is to be deployed based on the topology; and deploy the virtual machine as one of the one or more resources. In some implementations, the criteria for the topology identify one or more criteria for inclusion of resources or physical network devices in the deployment. In some implementations, the information identifying the plurality of physical network devices includes information regarding a lifecycle for a physical network device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A platform, comprising:
one or more memories; and
one or more processors configured to:
receive or determine information identifying a plurality of physical network devices,
wherein the plurality of physical network devices is associated with a plurality of resources;
receive information identifying criteria for a topology,
wherein a deployment based on the topology is to be configured using one or more resources, of the plurality of resources, associated with one or more physical network devices of the plurality of physical network devices,
wherein the criteria do not identify the one or more resources or the one or more physical network devices,
wherein the information identifying the plurality of physical network devices includes information regarding a first physical location and a second physical location of at least one physical network device of the plurality of physical network devices,
wherein the information regarding the first physical location and the second physical location is received based on a sweep procedure performed by the platform to determine the information identifying the plurality of physical network devices, and
wherein the information regarding the first physical location and the second physical location includes at least one of:
a length of time the at least one physical network device is at the first physical location, or
a length of time the at least one physical network device is at the second physical location;
select the one or more physical network devices or the one or more resources for the deployment based on the topology; and
automatically configure the one or more resources or the one or more physical network devices to provide the deployment based on the topology.

2. The platform of claim 1, where the one or more processors are further configured to:

store information identifying the topology associated with the one or more resources and a configuration associated with the one or more resources.

3. The platform of claim 1, wherein the one or more processors, when selecting the one or more resources, are further configured to:
   select the one or more resources based on a reservation associated with the one or more resources or the one or more physical network devices.

4. The platform of claim 1, wherein the information identifying the plurality of physical network devices identifies a module associated with a first physical network device of the plurality of physical network devices, and
   wherein the one or more processors are further configured to:
      determine that the module has changed to be associated with a second physical network device of the plurality of physical network devices; and
      store information indicating that the module was previously associated with the first physical network device and is now associated with the second physical network device.

5. The platform of claim 1, wherein the one or more resources include a virtual machine to be deployed as part of the deployment.

6. The platform of claim 1, wherein the one or more processors, when configuring the one or more physical network devices, are further configured to:
   modify a power state of the one or more physical network devices.

7. The platform of claim 1, wherein the one or more processors are further configured to:
   provide information identifying a graphical representation of the deployment.

8. The platform of claim 7, wherein the information identifying the graphical representation identifies a resource, of the one or more resources, associated with a physical network device of the one or more physical network devices.

9. The platform of claim 1, wherein the first physical location is a previous physical location, and the second physical location is a current physical location.

10. The platform of claim 1, wherein the at least one physical network device is a board, the first physical location is a first chassis, and the second physical location is a second chassis.

11. The platform of claim 1, wherein at least one physical network device, of the plurality of physical network devices, is auto-retired based on the information identifying the plurality of physical network devices.

12. The platform of claim 1, wherein the information identifying the plurality of physical network devices identifies at least one of:
   a geographical location of a physical network device of the plurality of physical network devices,
   a lab associated with the physical network device,
   an identifier of the physical network device,
   a resource implemented using the physical network device,
   a business identifier for the physical network device,
   a state, or
   a facility associated with the physical network device.

13. A non-transitory computer-readable medium storing instructions, the instructions comprising:
   one or more instructions that, when executed by one or more processors of a platform, cause the one or more processors to:
      receive or determine information identifying a plurality of physical network devices,
         wherein the information identifying the plurality of physical network devices includes information regarding a first physical location and a second physical location of at least one physical network device of the plurality of physical network devices,
         wherein the information regarding the first physical location and the second physical location includes at least one of:
            a length of time the at least one physical network device is at the first physical location, or
            a length of time the at least one physical network device is at the second physical location,
         wherein the plurality of physical network devices is associated with a plurality of resources, and
         wherein the plurality of resources are logical representations of network devices implemented using the plurality of physical network devices;
      receive information identifying criteria for a topology,
         wherein a deployment based on the topology is to be configured using one or more resources, of the plurality of resources, associated with one or more physical network devices of the plurality of physical network devices, and
         wherein the criteria do not identify the one or more resources or the one or more physical network devices;
      select the one or more physical network devices or the one or more resources for the deployment based on maximizing one or more of the criteria, wherein the maximized one or more of the criteria comprise one or more of resource utilization, throughput, or reliability;
      automatically configure the one or more resources or the one or more physical network devices to provide the deployment based on the topology; and
      store information identifying the topology and a configuration associated with the one or more physical network devices.

14. The non-transitory computer-readable medium of claim 13, wherein the information identifying the criteria does not identify a particular device or resource.

15. The non-transitory computer-readable medium of claim 13, wherein the one or more instructions that, when executed by one or more processors of the platform, further case the one or more processors to:
   determine that a virtual machine is to be deployed based on the topology; and
   deploy the virtual machine as one of the one or more resources.

16. A method, comprising:
   determining, by a platform, information identifying a plurality of physical network devices,
      wherein the information identifying the plurality of physical network devices includes information regarding a first physical location and a second physical location of at least one physical network device of the plurality of physical network devices,
      wherein the information regarding the first physical location and the second physical location includes one or more of:
         a length of time the at least one physical network device is at the first physical location, or
         a length of time the at least one physical network device is at the second physical location, wherein the plurality of physical network devices is associated with a plurality of resources, and wherein the plurality of resources are logical representations of network devices implemented using the plurality of physical network devices;

receiving, by the platform, information identifying criteria for a topology, the criteria comprising one or more of connection bandwidth, security features, ports to be used, or features to be provided, wherein a deployment based on the topology is to be configured using one or more resources, of the plurality of resources, associated with one or more physical network devices of the plurality of physical network devices, and wherein the criteria do not identify the one or more resources or the one or more physical network devices;

selecting, by the platform, the one or more physical network devices or the one or more resources for the deployment based on the criteria, wherein only physical network devices or resources reserved for a particular user are selected;

automatically configuring, by the platform, the one or more resources or the one or more physical network devices to provide the deployment; and storing, by the platform, information identifying the topology and a configuration associated with the one or more physical network devices.

17. The method of claim 16, wherein the information identifying the plurality of physical network devices identifies at least one of:

a geographical location of a physical network device of the plurality of physical network devices, a lab associated with the physical network device, an identifier of the physical network device, a resource implemented using the physical network device, a business identifier for the physical network device, a state, or a facility associated with the physical network device.

18. The method of claim 16, further comprising:

determining that a virtual machine is to be deployed based on the topology; and deploying the virtual machine as one of the one or more resources.

19. The method of claim 16, wherein the information identifying the plurality of physical network devices includes information regarding a lifecycle for a physical network device of the plurality of physical network devices.

20. The method of claim 16, wherein the first physical location is a previous physical location, and the second physical location is a current physical location.

* * * * *